(12) United States Patent
Dojcinovic et al.

(10) Patent No.: US 10,417,507 B2
(45) Date of Patent: Sep. 17, 2019

(54) FREESPACE DETECTION APPARATUS AND FREESPACE DETECTION METHOD

(71) Applicant: Conti Temic microelectronic GmbH, Nuremberg (DE)

(72) Inventors: Nikola Dojcinovic, Kronach (DE); Markus Friebe, Gefrees (DE)

(73) Assignee: Conti Temic microelectronic GmbH, Nuremberg (DE)

(*) Notice: Subject to any disclaimer, the term of this patent is extended or adjusted under 35 U.S.C. 154(b) by 0 days.

(21) Appl. No.: 15/517,086

(22) PCT Filed: Oct. 8, 2015

(86) PCT No.: PCT/EP2015/073206
§ 371 (c)(1),
(2) Date: Apr. 5, 2017

(87) PCT Pub. No.: WO2016/058893
PCT Pub. Date: Apr. 21, 2016

(65) Prior Publication Data
US 2017/0300765 A1    Oct. 19, 2017

(30) Foreign Application Priority Data

Oct. 13, 2014  (EP) .................................... 14188699

(51) Int. Cl.
*G06T 7/254*    (2017.01)
*G06K 9/00*     (2006.01)
*G06T 7/215*    (2017.01)

(52) U.S. Cl.
CPC .......... *G06K 9/00805* (2013.01); *G06T 7/215* (2017.01); *G06T 7/254* (2017.01);
(Continued)

(58) Field of Classification Search
CPC ..... G06K 9/00805; G06T 7/254; G06T 7/215; G06T 2207/10016; G06T 2207/20224; G06T 2207/20; G06T 2207/30261
(Continued)

(56) References Cited

U.S. PATENT DOCUMENTS 9,467,679 B2    10/2016  Wakabayashi et al.
9,880,010 B2 *  1/2018   Miksa .................... G01C 11/02
(Continued)

FOREIGN PATENT DOCUMENTS

DE    102011088332    6/2013
EP       2 037 409     3/2009
(Continued)

OTHER PUBLICATIONS

Extended European Search Report for European Patent Application No. EP 14 18 8699, dated Apr. 22, 2015, 5 pages, Munich, Germany.
(Continued)

*Primary Examiner* — Tung T Vo
(74) *Attorney, Agent, or Firm* — W. F. Fasse

(57) ABSTRACT

In a freespace detection apparatus and method, a camera provides at least first and second image data captured at different points in time. A motion vector of the camera is detected and assigned to the image data. The image data is transformed with respect to a predetermined, configurable image plane, and motion compensation of the transformed image data is performed. Difference image data between the motion compensated transformed image data and the transformed second image data is computed, and an object is identified in the computed difference image data.

18 Claims, 3 Drawing Sheets

(52) U.S. Cl.
CPC ............... *G06T 2207/10016* (2013.01); *G06T 2207/20* (2013.01); *G06T 2207/20224* (2013.01); *G06T 2207/30261* (2013.01)

(58) Field of Classification Search
USPC ........................................................ 348/148
See application file for complete search history.

(56) References Cited

U.S. PATENT DOCUMENTS

| | | | |
|---|---|---|---|
| 2004/0151394 A1* | 8/2004 | Soderberg | H04N 19/593 382/250 |
| 2005/0128323 A1* | 6/2005 | Choi | G03B 29/00 348/239 |
| 2008/0089556 A1* | 4/2008 | Salgian | G06K 9/209 382/103 |
| 2008/0205706 A1 | 8/2008 | Hongo | |
| 2009/0074247 A1 | 3/2009 | Ma et al. | |
| 2010/0149333 A1 | 6/2010 | Yang | |
| 2014/0104424 A1 | 4/2014 | Zhang et al. | |
| 2014/0267415 A1* | 9/2014 | Tang | G06T 11/60 345/633 |
| 2014/0368656 A1 | 12/2014 | Hayakawa et al. | |
| 2016/0048966 A1* | 2/2016 | Kuehnle | G06T 5/50 348/38 |

FOREIGN PATENT DOCUMENTS

| | | |
|---|---|---|
| EP | 2 797 320 | 10/2014 |
| JP | 2008-219063 A | 9/2008 |
| JP | 2013-074350 A | 4/2013 |
| JP | 2013-074423 A | 4/2013 |
| WO | WO 2013/094242 | 6/2013 |

OTHER PUBLICATIONS

International Search Report of the International Searching Authority for International Application PCT/EP2015/073206, dated Feb. 10, 2016, 3 pages, European Patent Office, HV Rijswijk, Netherlands.
PCT Written Opinion of the International Searching Authority for International Application PCT/EP2015/073206, dated Feb. 10, 2016, 5 pages, European Patent Office, Munich, Germany.
PCT Written Opinion of the International Preliminary Examining Authority for International Application PCT/EP2015/073206, dated Sep. 30, 2016, 6 pages, European Patent Office, Munich, Germany.
PCT International Preliminary Report on Patentability for International Application PCT/EP2015/073206, dated Jan. 20, 2017, 6 pages, European Patent Office, Munich, Germany.
Partial English translation of Japanese Office Action in Japanese Patent Application No. 2017-518537, dated Jun. 26, 2019, 3 pages.

\* cited by examiner

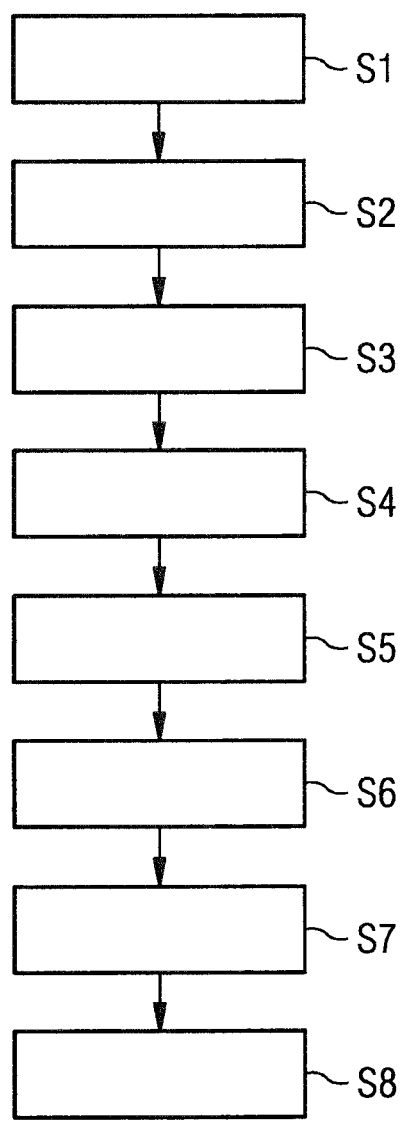

FREESPACE DETECTION APPARATUS AND FREESPACE DETECTION METHOD

FIELD OF THE INVENTION

The present Invention relates to a freespace detection apparatus, a freespace detection method and an advanced driver assistance system comprising a freespace detection apparatus.

BACKGROUND INFORMATION

In modern cars, a plurality of sensors and other sources of information enable Advanced Driver Assistance Systems (ADAS) to support a driver in complex driving situations, up to high automated driving. A camera-based surround view system represents one component of an ADAS. Such a surround view system performs freespace detection in order to identify objects in the environment of the vehicle and provides this information to the ADAS.

Freespace detection in conventional surround view systems is mainly performed with structure from motion (SFM) algorithms. These algorithms only can be applied on static environmental areas. At least two or more supporting frames are required for freespace detection with SFM algorithms, which increases latency and memory consumption. Usually, SFM algorithms can only be applied on a signal from a single camera.

Accordingly, there is a need for enhanced freespace detection. In particular, there is a need for a freespace detection which can be applied on static and moving environment, and which requires reduced computational effort.

SUMMARY OF THE INVENTION

According to a first aspect, the present invention provides a freespace detection apparatus, comprising a camera adapted to provide first image data at a first time and second image data at a second time different from the first time; a motion detector adapted to detect motion of the camera, determine a motion vector corresponding to the detected motion of the camera, and assign the determined motion vector to the provided first image data; a transformation means adapted to transform the provided first and second image data to a configurable pre-set image plane, and output transformed first image data and transformed second image data; a motion compensation means adapted to generate motion compensated transformed first image data based on the transformed first image data, the motion vector assigned to the first image data and time difference between the first time and the second time; a computing means adapted to compute a difference between the motion compensated transformed first image data and the transformed second image data; and a segmentation means adapted to compare the computed difference between the motion compensated transformed first image data and the transformed second image data and to identify an object in the computed difference image data, if the difference exceeds a predetermined threshold.

According to a second aspect, the present invention provides a freespace detection method comprising the steps of providing, by a camera, first image data at a first time; providing, by the camera, second image data at a second time different from the first time; detecting motion of the camera and determine a motion vector corresponding to the detected motion of the camera; transforming the provided first image data and the provided second image data to a configurable pre-set image plane to provide transformed first image data and transformed second image data; generating motion compensated transformed first image data based on the transformed first image data, the detected motion vector and a time difference between the first time and the second time; computing a difference between the motion compensated transformed first image data and the transformed second image data; and comparing the computed difference between the motion compensated transformed first image data and the transformed second image data, and identifying an object in the computed difference image data, if the difference exceeds a predetermined threshold.

According to a further aspect, the present invention provides an Advanced Driver Assistance System comprising a freespace detection apparatus of the present invention.

According to still a further aspect, the present invention provides a computer program product adapted to perform a freespace detection method according to the present invention.

It Is an underling idea of the present invention to transform the image data to a predetermined image plane. Such a predetermined image plane might be any appropriate image plane for object detection. In particular, depending on the environmental situation and/or the movement of the camera, different image planes for a further processing may be suitable. The image plane on which the image data are to be transformed may be parallel to a ground plane or inclined with respect to the ground plane. The image plane may be flat or curved. In order to adapt the freespace detection to different environmental situations, the image plane for transforming the image data may be adjustably. Since this transformation of the captured image data is based on predetermined algorithms and mathematical formulas, any unexpected elements, such as objects in the environment of the vehicle may lead to divergences that are different in the transformed image data. As these divergences appear in successive motion compensated images, objects in the environment of the vehicle can be easily detected by comparing successive motion compensated transformed image data A further idea of the present invention is to take into account the motion of an image capturing device, and to consider this detected motion when performing freespace detection using timely successive images captured by the image capturing device. The motion of the image capturing device, for instance, a camera, can be detected either by a separate device or based on already existing information. Such already existing information for determining a motion vector can be obtained, for instance, by data provided from an Advanced Driver Assistance System, a navigation system, or any other device of a vehicle. Any further means for detecting or computing a motion vector might be possible, too.

Freespace detection according to the present invention can be applied on static or stationary features as well as on moving features of the environment. Since only two image frames are required for freespace detection, latency and memory consumption are reduced with respect to conventional structure from motion algorithms. Further, the freespace detection according to the present invention can be easily adapted to the available processing power by scaling the spatial accuracy. Thus, the very flexible freespace detection can be achieved.

The freespace detection according to the present invention is further able to handle single camera image signals as well as to combine multicamera image signals. Thus, the freespace detection according to the present invention is more flexible than a conventional SFM algorithm which only works on a single camera image.

According to a further embodiment, the camera of the freespace detection apparatus comprises a plurality of image capturing means for capturing image data. The camera is adapted to combine the captured image data from the plurality of image capturing means to first or second image data. Accordingly, multicamera image signals can be provided. This enables a more flexible and detailed freespace detection.

According to a further embodiment, the freespace detection apparatus comprises a memory for storing the first and second image data provided by the camera, the transformed first and second image data, the motion compensated transformed second image data, the difference image data and/or the identified object. In this way, input data, intermediate results as well as the output results can be stored and used for further operations. In particular, by storing the intermediate results such as the transformed image data or the motion compensated image data, the respective data can be re-used without computing these data again. Accordingly, the computational effort can be further minimized.

According to a further embodiment, the configurable preset image plane is adjusted depending on an environmental parameter. In this way, the freespace detection can be enhanced, even if the environmental situation changes.

According to a further embodiment, the configurable preset image plane is selected out of a plurality of predetermined image planes. In this way, an appropriate image plane can be easily selected.

According to a further embodiment, the method further comprises a step for adjusting said configurable preset image plane.

According to a further embodiment the configurable preset image plane is selected out of a plurality of predetermined image planes.

According to a further embodiment said plurality of predetermined image planes comprises at least a ground plane, an inclined plane and/or a parabolic plane.

According to a further embodiment the step for adjusting said configurable preset image plane comprises a step for obtaining at least one environmental parameter, and adjusting said configurable preset image plane based on the obtained environmental parameter.

According to a further embodiment, the transforming step transforms the first image data and the second image data provided by the camera based on a predetermined model. By using a predetermined model, such as a mathematical model, a predetermined algorithm, etc. a reliable and fast transformation provided image data can be achieved.

According to a further embodiment, the identifying step comprises a step for comparing absolute values of the difference image data with a predetermined threshold value. By comparing of the difference image data with a predetermined threshold value, a quick and easy identification of deviations can be achieved.

According to a further embodiment, the method comprises a step for classifying the identified object based on the computed difference between the motion compensated transformed first image data and the transformed second image data. By classifying the identified object, additional information for further processing can be provided. In this way, the reliability of the image data can be further improved.

According to a particular embodiment, the classifying step discriminates between fixed objects and moving objects.

Further advantages and embodiments of the present invention will be apparent by the following description as reference to the accompanying figures.

BRIEF DESCRIPTION OF THE DRAWINGS

FIG. 4: a flowchart illustrating a freespace detection method according to the present invention.

DETAILED DESCRIPTION OF EXAMPLE EMBODIMENTS OF THE INVENTION

Figure 1:
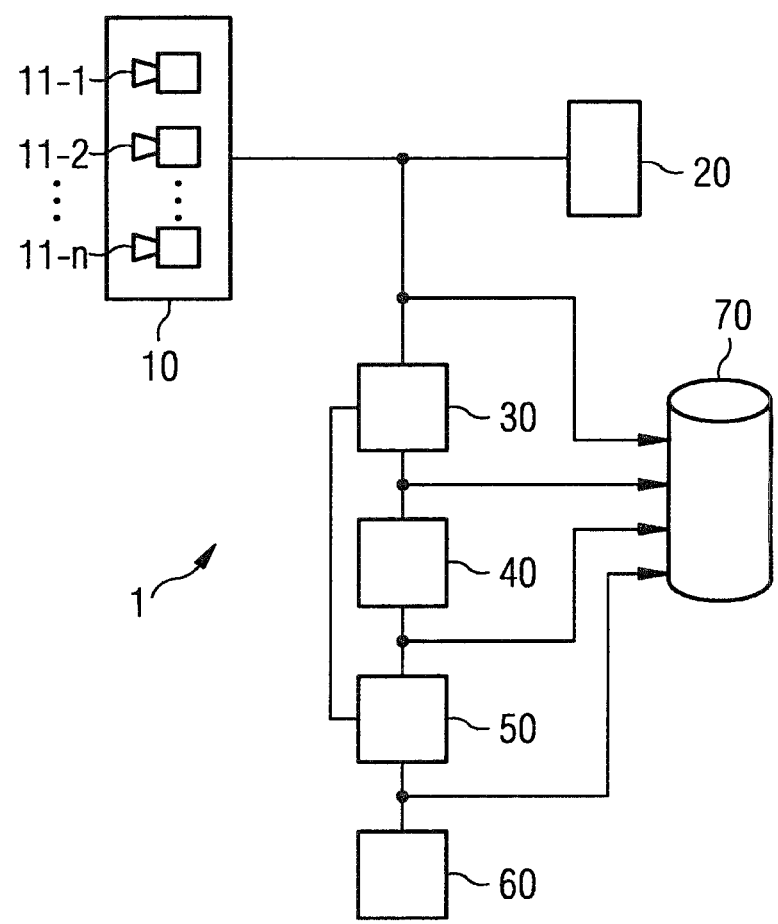
FIG. 1: a block diagram of a freespace detection apparatus according to an embodiment of the present invention.

FIG. 1 shows a block diagram of a freespace detection apparatus 1. The freespace detection apparatus 1 comprises a camera 10, a motion detector 20, a transformation means 30, a motion compensation means 40, a computing means 50, and a segmentation means 60. Further, the freespace detection apparatus 1 may comprise one or more memories 70. The camera 10 may further comprise a plurality of image capturing means 11-$i$ for capturing image data.

Camera 10 captures an image frame and provides image data of the captured image frame for further processing. Preferably, camera 10 may periodically fires capture image frames. For this purpose, camera 10 captures image frames with a predetermined time interval. Additionally, camera 10 may assign a time stamp to each captured image frame. In this way, the point in time when the image frame has been captured can be easily determined during the further processing of the image data.

If the camera 10 comprises a plurality of image capturing means 11-$i$, each image capturing means 11-$i$ may capture an image frame at the same time, and the image data of all image frames captured at the same time may be combined. Thus, the combined data of all image frames captured at the same time can be further processed as common image data.

In order to adapt the captured image data to the processing capability of the freespace detection apparatus 1, the resolution of the captured image data may be adapted. For this purpose, the captured image data may be downscaled in order to reduce the amount of image data and to reduce the computational effort and the memory consumption for the further operations. However, if the freespace detection apparatus 1 has enough computational capabilities and memory resources for processing the image data with a high resolution, the accuracy of the processing can be improved.

Further, motion of the camera 10 is detected and a motion vector is assigned to the image data captured by camera 10. For this purpose, the freespace detection apparatus 1 may comprise a motion detector 20 for detecting a motion vector of the camera 10. For instance, motion detector 20 may comprise a global position system (GPS) sensor, a gyroscope, an acceleration sensor, etc. Further means for detecting the motion of the camera 10 may be also possible.

Alternatively, the motion of the camera 10 may be already determined by means of another system and information of the detected motion can be provided to the freespace detection apparatus 1. For example, if the freespace detection apparatus 1 is part of a vehicle and this vehicle already comprises a means for detecting or determining the motion of the vehicle, this motion information may be provided to the freespace detection apparatus 1. For instance, the vehicle may comprise an Advanced Driver Assistance System (ADAS), a navigation system, etc. If information about the motion of the vehicle is already available, this information may be provided to the freespace detection apparatus 1 via a digital bus system, for instance, a CAN-bus. Any other communication system for providing information about the motion to the freespace detection apparatus 1 is also possible. Further to this, it is also possible to detect motion of the camera 10 based on the image data provided by the camera 10. For this purpose, any algorithm for image based motion detection may be used.

After the motion of the camera 10 has been detected by motion detector 20 or motion information has been received from another means, a motion vector corresponding to the detected motion is assigned to the image data provided by camera 10. If the time interval for detecting motion of the camera is different from the frame rate of camera 10 for providing image data, the determination of the motion vector may interpolate the detected motion in order to adapt the motion vector to the frame rate of the image data. The image data, the assigned time stamp and the assigned motion vector can be forwarded to transformation means 30. Additionally or alternatively, the image data from camera 10, the corresponding time stamp and motion vector may be stored in memory 70.

Next, a transformation means 30 receives the image data from camera 10 and/or reads the image data from memory 70. The transformation means 30 performs a transformation of the image data with respect to a predetermined image plane. For example, the image data may be transformed to an image plane corresponding to the ground plane or an image plane parallel to the ground plane. The predetermined image plane may correspond to an image plane which is inclined with respect to the ground plane and/or which is inclined with respect to a plane orthogonal to the motion vector of camera 10.

The predetermined image plane may be a flat image plane. Alternatively, it is also possible to transform the image data to a curved image plane. For instance, such a curved image plane may be a cylindrical or spherical image plane. The curved image plane may be a convex or a concave image plane. The curved image plane may also comprise a parabolic image plane or any other curved image plane.

The predetermined image plane may be a predetermined fixed image plane, and this predetermined image plane may be used for all transforms of image data. Alternatively, the image plane on which the transformation is based may be adapted. For instance, an appropriate image plane may be selected out of a set of possible image planes. For example, an inclination of the image plane with respect to the ground plane may be adapted. It may be also possible to select between flat image planes and curved image planes.

The selection of the predetermined image plane for transforming the image data may be performed, for instance, based on environmental parameters. The selection of the image plane may be based on a speed of the camera (or the vehicle with the camera), a driving direction, a traffic situation, etc. For example, a first image plane may be used, if the speed is below a predetermined threshold value, and a second image plane is used, if the speed exceeds the predetermined threshold value. Further, a particular image plane may be selected, if a particular, predetermined feature, for instance a crossroad, is detected in the environment of the camera. Additionally or alternatively, the image plane for transforming image data may be adapted depending on the position of the camera 10 (or a vehicle comprising the camera 10). For example, the position of the camera may be detected by means of a position detector, such as a GPS or an ADAS comprising a navigation system. Further parameters for adapting the image plane for image transformation or selecting an appropriate image plane may be possible, too.

In order to perform such a transformation of the image data to the predetermined image plane, any conventional transformation algorithm may be applied to the image data. Such an image transformation algorithm may be based on well-known mathematical models. However, new mathematical models and transformation algorithms may be also developed for transforming the captured image data to top view image data. After the transformation means 30 has transformed the image data with respect to the predetermined image plane, the transformed image data may be stored in memory 70 or forwarded for further operations.

In order to compare image data which have been captured at different points in time, motion of image data is compensated by motion compensation means 40. Motion compensation means 40 may analyze the time difference between two successive images, for instance, based on the time stamps assigned to the image data. Based on this time difference, the motion of the camera 10, or a vehicle including the freespace detection apparatus 1 can be computed. If the image plane on which the image data are transformed is parallel to the ground plane, the transformed image data can be shifted in x-direction and y-direction according to the computed motion. If the image plane on which the image data are transformed is not parallel to the ground plane and/or the image plane is curved, the orientation/configuration of the image plane is taken into account when performing motion compensation. The motion compensated transformed image data may be also stored in memory 70 or directly for a further analysis of the image data.

Next, computing means 50 computes a difference between transformed image data relating to image frames which have been captured at different points in time. It is for this purpose that differences between pixel elements of transformed image data are computed. All image data used for computing the difference image data are motion compensated with respect to the same point in time. For instance, if the transformed second image data relate to a particular point in time, and additional first image data is used, the additional image data has to be motion compensated by motion compensation means 40 with respect to the time stamp assigned to the second image data. Additionally, for each pixel element the absolute values of the differences between the transformed second image data and the motion compensated transformed first image data may be computed.

The computed difference image data, in particular the computed absolute difference image data may be stored in memory 70 or forwarded to segmentation means 60.

Segmentation means 60 analyzes the difference image data computed by computing means 50 in order to identify one or more objects in the computed difference image data. For instance, segmentation means 60 may compare the absolute values of the computed difference image data with a predetermined threshold value. If pixel elements exist in the computed difference image data having a value higher than the predetermined threshold value, these elements may be used as a basis for identifying an object at the corresponding position in the image data. For example, adjacent pixels in the image data relating to a difference higher than a predetermined value may be combined and considered as a common element. Further to this, any other method or algorithm for image segmentation, in particular an image segmentation based on differential image data may be possible.

Additionally, segmentation means 60 may classify an identified object in the computed difference image data. For instance, such classification may discriminate between fixed objects and moving objects in the environment of the freespace detection apparatus 1. Classification of the detected objects may be based, for instance, on the absolute values in the difference image data and/or the extension of an area having values higher than a predetermined threshold value. Any further method for identifying and/or classifying an object in the difference image data is also possible.

Finally, segmentation means 60 may output object data specifying one or more objects identified in the differential image data. For instance, segmentation means 60 may output an object list comprising position, size and/or classification of the identified objects. Providing any further information about the identified objects is also possible. The information about the identified objects may be stored in memory 70 or directly forwarded to a further processing means. For instance, the identified objects may be provided to a car environmental model, for instance, a dempster shafer grid. The information about the objects identified in the environment of the freespace detection apparatus 1 may be also used, for instance, in an Advanced Driver Assistance System, or any other device.

Figure 2:
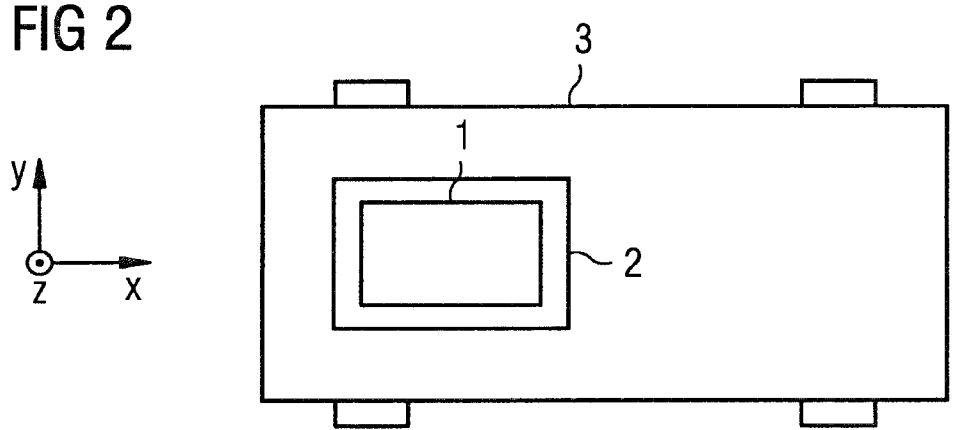
FIG. 2: a vehicle with a freespace detection apparatus according to a further embodiment.

FIG. 2 shows a vehicle 3 comprising an Advanced Driver Assistance System (ADAS) 2 comprising a freespace detection apparatus 1. The information about one or more objects detected in the environment of the vehicle 3 by freespace detection apparatus 1 may be used by the ADAS 2. For instance, information about detected objects in the environment may be indicated to a driver of the vehicle. Alternatively or additionally, the information may be also used in the ADAS 2 in order to adapt the speed of the vehicle, to initiate a braking operation or to start another operation of the ADAS 2.

Further to a freespace detection apparatus 1 in an Advanced Driver Assistance System 2 of a vehicle 3, the freespace detection apparatus 1 may also provide information about objects in the environment of any further moving device. For example, such devices may be any appropriate device in industrial or medical areas.

Figure 3A:
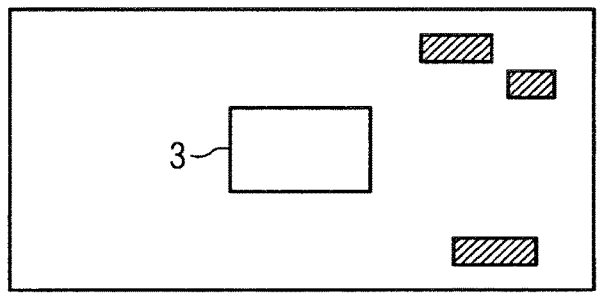
FIGS. 3a to 3d: examples of image data processed by a freespace detection according to an embodiment of the present invention.

FIG. 3a shows an image of transformed image data from a camera 10 of a vehicle 3. In order to cover the whole environment of the vehicle 3, a plurality of image capturing means 11-i may be employed in the camera 10. For instance, a first image capturing means may cover the front part of the vehicle 3, a second image capturing means may cover the back part of the vehicle 3, and a third and fourth image capturing means may cover the left and the right part of the vehicle 3. Any other configurations of image capturing means 11-I for covering the environment of the vehicle is also possible.

Figure 3B:
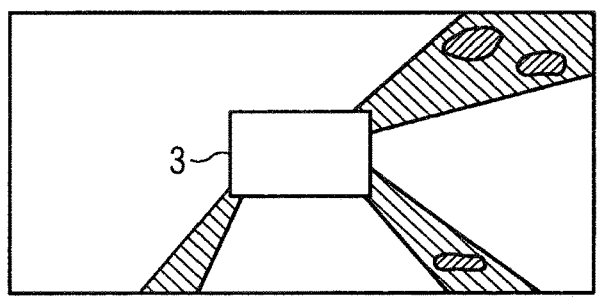

FIG. 3b illustrates difference image data between image data of two image frames captured at different points in time, wherein the image data are transformed to a predetermined image plane and the transformed image data are motion compensated in order to compensate differences due to the motion of the vehicle 3. The shaded areas in FIG. 3b illustrate differences between successively captured motion compensated transformed image data.

Figure 3C:
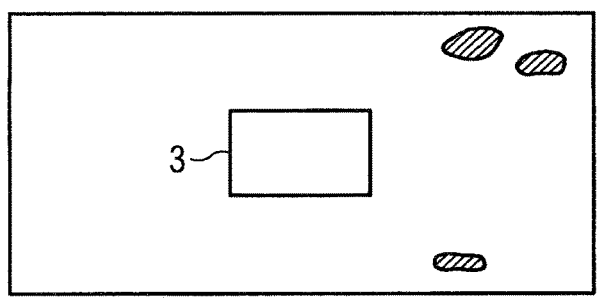
Figure 3D:
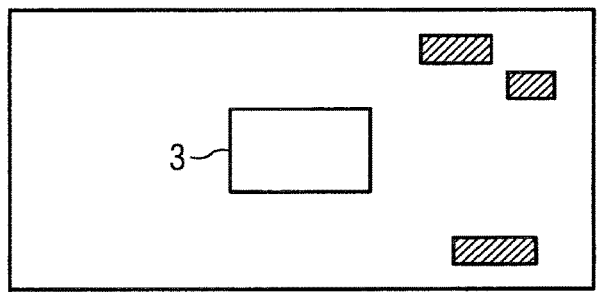

FIG. 3c shows in the shaded areas all parts of the difference image data having an absolute value larger than a predetermined threshold value. Based on the identified data in the difference image data having such a value larger than a predetermined threshold value, objects can be identified in the image data as illustrated in FIG. 3d.

FIG. 4 illustrates a flowchart of a freespace detection method underlying a further embodiment of the present invention.

In a first step S1, first image data are provided by a camera 10 at a first time. Subsequently in step S2, the camera 10 provides second image data. Preferably, camera 10 provides image data at predetermined time intervals in order to perform a periodic image capturing operation. The steps S1 and S2 further may assign a time stamp to the image data. In this way, the image capturing time can be easily identified during the further processing of the image data.

Additionally, in a further step S3, detecting motion of the camera 10 is performed. Such a detection of motion can be performed, for instance, by a separate device. Alternatively, the detection of the motion of the camera 10 can be also performed by identifying the motion of a platform comprising the camera 10. For instance, the camera 10 may be mounted in a vehicle 3, and the motion of the vehicle 3 is determined by a further device of the vehicle 3, such as a navigation system or an Advanced Driver Assistance System 2. In this case, the motion of the vehicle 3 corresponding to the motion of the camera 10 may be provided by such a device. Further, motion can be detected by analyzing the image data captured by the camera 10. If the time interval for detecting motion is different from the frame rate of the camera 10, the detected motion may be interpolated in order to adapt the motion to the frame rate of the captured image data.

The first image data and the second image data provided by camera 10 are transformed in step S4 with respect to a predetermined image plane. The predetermined image plane can be any image plane as already outlined above. The image plane for transforming the image data may be fixed or may be configurable. In particular, the image plane may be adjusted as already outlined above.

In step S5, motion compensation of the transformed first image data is performed based on the motion vector and a time difference between the point in time for capturing the first image data and the point in time for capturing the second image data. For instance, a time difference between the time stamp assigned to the first image data and the time stamp assigned to the second image data may be computed. Based on this time difference, the motion of the camera, in particular the motion with respect to a predetermined coordinate system, may be calculated. Based on this motion, the second image data are shifted accordingly in order to obtain motion compensated transformed second image data.

After the first image data and the second image data are transformed and motion compensation has been performed to obtain matching image data, difference image data between the motion compensated transformed first image data and the transformed second image data are computed in step S6. Additionally, absolute values of the difference image data may be computed.

Based on the difference image data computed in step S6, an object is identified in step S7. For instance, areas in the difference image data may be identified having an absolute value larger than a predetermined threshold value. Based on such an area having absolute values larger than a predetermined threshold value, a segmentation of the difference image data can be performed. The segmented difference image data can be analyzed in order to identify individual objects or areas comprising a plurality of objects.

Additionally, the identified objects in the difference image data can be classified. For instance, based on characteristic parameters of the image data, in particular the difference image data of the transformed images, predetermined properties of the identified objects may be determined and one or more of such properties may be assigned to the identified objects. For instance, such a classification may differentiate between fixed objects in the environment and moving objects.

The freespace detection method may be performed, for instance, on a computer device. For this purpose, a computer program product may be provided which is adapted to perform the above outlined method.

Accordingly, motion detector 20, transformation means 30, motion compensation means 40, computing means 50 and/or segmentation means 60 may be realized by a micro processor performing computer program code which is appropriate for realizing the corresponding means of the freespace detection apparatus 1.

In conclusion, the present invention provides an enhanced freespace detection. Subsequent image frames captured at different points in time are transformed with respect to a predetermined, configurable image plane. Motion of the device capturing the image frames is determined. The captured image data is motion compensated according to the detected motion. Based on differences in the transformed motion compensated image data an efficient and reliable detection of objects can be achieved.

The invention claimed is:

1. A freespace detection apparatus, comprising:
   a camera that comprises plural image capturing devices respectively oriented in different directions and configured to capture individual image data respectively in the different directions, wherein said camera is configured to combine said individual image data from said plural image capturing devices to form combined first image data captured at a first time and to form combined second image data captured at a second time different from said first time;
   a motion detector configured and arranged to detect motion of said camera, determine a motion vector corresponding to the detected motion of said camera, and assign the determined motion vector to said combined first image data provided by said camera;
   a transformation device configured and arranged to transform said combined first image data and said combined second image data to a configurable preset image plane, and to produce transformed first image data and transformed second image data;
   a motion compensation device configured and arranged to generate motion-compensated transformed first image data based on said transformed first image data, said motion vector assigned to said combined first image data and a time difference between said first time and said second time;
   a computing device configured and arranged to produce computed difference image data by computing a difference between said motion-compensated transformed first image data and said transformed second image data; and
   a segmentation device configured and arranged to analyze said computed difference image data to identify an object in said computed difference image data when the difference exceeds a predetermined threshold,
   wherein said configurable preset image plane is selected out of a set of possible image planes, wherein the set of possible image planes comprises a ground plane, a plane parallel to the ground plane, an image plane inclined with respect to the ground plane and/or a plane inclined with respect to a plane orthogonal to the detected motion vector of the camera.

2. The freespace detection apparatus according to claim 1, further comprising a memory configured to store said combined first image data and said combined second image data, said transformed first image data and said transformed second image data, said motion-compensated transformed first image data, said difference image data and/or said identified object.

3. The freespace detection apparatus according to claim 1, wherein the configurable preset image plane is adjusted depending on an environmental parameter.

4. A combination comprising the freespace detection apparatus according to claim 1 incorporated in an advanced driver assistance system of a motor vehicle.

5. A freespace detection method comprising:
   with a camera that includes plural image capturing devices respectively oriented in different directions, capturing individual image data respectively in the different directions, and combining the individual image data from said plural image capturing devices to form combined first image data captured at a first time and to form combined second image data captured at a second time different from said first time;
   detecting motion of said camera, and determining a motion vector corresponding to the detected motion of said camera;
   transforming said combined first image data and said combined second image data to a configurable preset image plane to produce transformed first image data and transformed second image data;
   generating motion-compensated transformed first image data based on said transformed first image data, said motion vector and a time difference between said first time and said second time;
   computing a difference between said motion-compensated transformed first image data and said transformed second image data; and
   from the computed difference between the motion-compensated transformed first image data and the transformed second image data, producing computed difference image data, and identifying an object in said computed difference image data when the difference exceeds a predetermined threshold,
   wherein said configurable preset image plane is selected out of a set of possible image planes, wherein the set of possible image planes comprises a ground plane, a plane parallel to the ground plane, a plane inclined with respect to the ground plane, and/or a plane inclined with respect to a plane orthogonal to the motion vector of the camera.

6. The method according to claim 5, wherein said transforming transforms said combined first image data and said combined second image data based on a predetermined model or algorithm.

7. The method according to claim 5, further comprising adjusting said configurable preset image plane.

8. The method according to claim 7, wherein said adjusting of said configurable preset image plane comprises obtaining at least one environmental parameter, and adjusting said configurable preset image plane based on the at least one environmental parameter.

9. The method according to claim 5, wherein said image plane is a parabolic plane.

10. The method according to claim 5, further comprising classifying said identified object based on said computed difference between the motion-compensated transformed first image data and the transformed second image data.

11. The method according to claim 10, wherein said classifying discriminates between fixed objects and moving objects.

12. A non-transitory computer program product that stores thereon computer program code, which is configured and adapted to perform the method according to claim 5 when executed by a computer device.

13. The method according to claim 5, wherein said image plane is a cylindrical plane.

14. The method according to claim 5, wherein said image plane is a spherical plane.

15. The method according to claim 5, wherein said image plane is said ground plane.

16. The method according to claim 5, wherein said image plane is said plane parallel to the ground plane.

17. The method according to claim 5, wherein said image plane is said plane inclined with respect to the ground plane.

18. The method according to claim 5, wherein said image plane is said plane inclined with respect to the plane orthogonal to the motion vector of the camera.

* * * * *